(12) United States Patent
Koshizaka et al.

(10) Patent No.: US 7,315,104 B2
(45) Date of Patent: Jan. 1, 2008

(54) IRON CORE AND METHOD OF MANUFACTURING THE SAME AND APPARATUS FOR MANUFACTURING THE SAME

(75) Inventors: Atsushi Koshizaka, Hitachinaka (JP); Toshiaki Ueda, Naka (JP); Yuichi Kirihara, Hitachinaka (JP); Keiji Kawahara, Hitachinaka (JP); Susumu Sasaki, Naka (JP)

(73) Assignees: Hitachi, Ltd., Tokyo (JP); Hitachi Car Engineering Co., Ltd., Hitachinaka-shi (JP)

( * ) Notice: Subject to any disclaimer, the term of this patent is extended or adjusted under 35 U.S.C. 154(b) by 328 days.

(21) Appl. No.: 10/920,193

(22) Filed: Aug. 18, 2004

(65) Prior Publication Data
US 2005/0061046 A1   Mar. 24, 2005

(30) Foreign Application Priority Data
Sep. 18, 2003   (JP) ............................. 2003-326557

(51) Int. Cl.
*H02K 11/02* (2006.01)
*H02K 15/12* (2006.01)

(52) U.S. Cl. ..................... 310/216; 310/217; 310/259

(58) Field of Classification Search .................. 310/42, 310/216, 254, 259, 217; 29/596, 598, 605
See application file for complete search history.

(56) References Cited

U.S. PATENT DOCUMENTS 3,577,851 A * 5/1971 Detheridge et al. ........... 29/596
3,842,493 A   10/1974 Ohuchi et al.
3,886,256 A * 5/1975 Ohuchi et al. ............... 310/216
4,116,033 A * 9/1978 Iwaki et al. ................... 72/142
4,914,934 A   4/1990 Fritzsche
5,798,583 A * 8/1998 Morita .......................... 310/42
6,023,119 A * 2/2000 Asao ........................... 310/216
6,308,549 B1   10/2001 Tokizawa et al.
6,777,848 B1 * 8/2004 Joho et al. ................... 310/216

FOREIGN PATENT DOCUMENTS

| GB | 2 349 749 A | 11/2000 |
|---|---|---|
| JP | 01-164247 | 6/1989 |
| JP | 2000-224817 | 8/2000 |

OTHER PUBLICATIONS

European Search Report dated Nov. 2, 2005 (Four (4) pages).

* cited by examiner

*Primary Examiner*—Dmitry Suhol
(74) *Attorney, Agent, or Firm*—Crowell & Moring LLP

(57) ABSTRACT

An apparatus for manufacturing an iron core comprising: a plate thickness measurement unit for measuring a thickness of the strip as an intermediate product of the iron core; an inlet guide for positioning the strip in a widthwise direction thereof; a mil roll unit for performing a rolling-bending process to the strip fed out of the inlet guide; a restraint jig for shaping the strip fed out of the mil unit and holding a curvature thereof constant; and a curvature measurement unit for measuring a curvature of the strip to which the rolling-bending process has been performed by using said mill roll. Position control of the inlet guide, the pressure roll unit, and the restraint jig is performed based on at least one of the plate thickness and the curvature of the strip.

10 Claims, 5 Drawing Sheets

IRON CORE AND METHOD OF MANUFACTURING THE SAME AND APPARATUS FOR MANUFACTURING THE SAME

CLAIM OF PRIORITY

The present application claims priority from Japanese application serial no. 2003-326557, filed on Sep. 18, 2003, the content of which is hereby incorporated by reference.

FIELD OF THE INVENTION

The present invention relates to an iron core for an electric rotary machine such as a motor and, more particularly, to an iron core manufactured by forming a strip (band-like plate) into a spirally laminated structure through a rolling-bending process, to a method of manufacturing the same, and to an apparatus for manufacturing the same.

BACKGROUND OF THE INVENTION

In the electric rotary machine such as a motor, a method of manufacturing the iron core by forming a strip into a spirally laminated structure through a rolling-bending process is well known. In such a manufacturing method, the strip is bent into a spiral configuration by rolling one edge thereof with a mill roll. In other words, the strip is rolled by the mill roll so as to thin toward the outer circumferential edge side.

To increase the accuracy of bending by the rolling-bending process, it is necessary to hold an amount of rolling uniform. Even when the amount of rolling is held uniform, however, the post-process curvature of the strip will not be uniform if the strip has thickness variations. In general, the thickness (t) of the strip has variations of about ±3 to 7%. The post-process curvature of the strip varies even when the mechanical property (hardness, tensile strength, elongation property, or the like) of the strip varies.

In an example disclosed in Japanese Patent Laid-Open No. H 1(1989)-164247, whose applicant is the same as that of the present application, a guide comprising a plurality of rollers arranged in an arcuate configuration is provided close to the outlet of a mill roll. The strip is bent to have a specified curvature with a bending force given the rollers provided close to the outlet of the mill roll, while the inner circumferential edge of the strip is rolled by the mill roll.

In an example disclosed in Japanese Patent Laid-Open No. 2000-224817, a pair of mill rolls and a member for restricting the narrowing down of a strip in a widthwise direction thereof are provided. Further, four notches for mounting bolts are provided at even intervals in the outer circumferential portion of an iron core.

In the example disclosed in Japanese Patent Laid-Open No. H 1(1989)-164247, the accuracy of the post-process curvature of the strip is guaranteed by the plurality of rollers arranged in the arcuate configuration close to the outlet of the mill roll. If the variations in the thickness of the strip are large, however, it is difficult to guarantee the accuracy of the curvature of the strip.

In the example disclosed in Japanese Patent Laid-Open No. 2000-224817, although providing the member for restricting the narrowing down of the strip in a widthwise direction, if the strip has thickness variations, it is extremely difficult to guarantee the accuracy of the post-process curvature of the strip after the mill roll process.

SUMMARY OF THE INVENTION

The present invention is applied an iron core for an electric rotary machine manufactured by forming a strip into a spirally laminated structure through a rolling-bending process. The object of the invention is to make high-accuracy manufacturing of the iron core possible even if the strip has thickness variations.

In accordance with the present invention, an iron core is a ring-shaped iron core for an electric rotary machine formed by shaping a strip into a spirally laminated structure. And the outer periphery of the iron core is provided with notches spreading in the axial direction of the core at regular intervals in the circumferential direction. Further a depth of each of the notches is smaller than a width of each notch after rolling of the strip.

In accordance with the present invention, method of manufacturing an iron core comprising:

a thickness measuring step of measuring a thickness of a strip as intermediate product of the iron core; a strip positioning step of positioning the strip in a widthwise direction thereof by using an inlet guide for a mill roll unit; a rolling-bending step of performing a rolling-bending process to the strip fed out of the inlet guide by using the mill roll; and a position control step of controlling the position of the inlet guide to adjust an amount of rolling based on the measured value of the thickness of the strip.

In accordance with the present invention, an apparatus for manufacturing an iron core comprising: a plate thickness measurement unit for measuring a thickness of the strip as an intermediate product of the iron core; an inlet guide for positioning the strip in a widthwise direction thereof; a mil roll unit for performing a rolling-bending process to the strip fed out of the inlet guide; a restraint jig for shaping the strip fed out of the mil unit and holding a curvature thereof constant; and a curvature measurement unit for measuring a curvature of the strip to which the rolling-bending process has been performed by using said mill roll. Position control of the inlet guide, the pressure roll unit, and the restraint jig is performed based on at least one of the plate thickness and the curvature of the strip.

DESCRIPTION OF THE PREFERRED EMBODIMENTS

Figure 1:
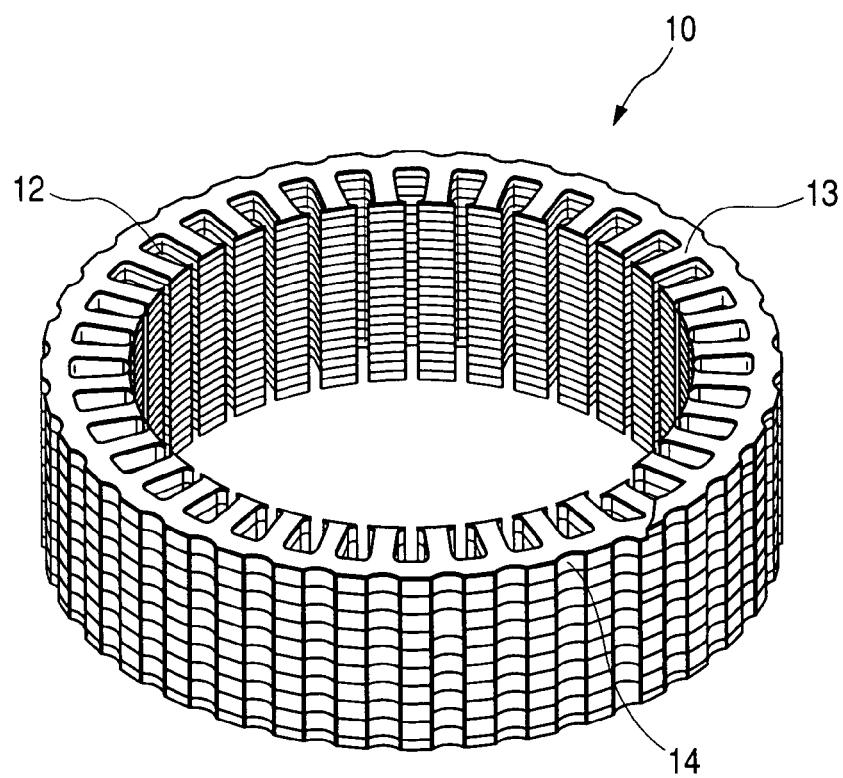
FIG. 1 is a perspective view showing the outer appearance of an iron core according to the present invention.

FIG. 1 is a view showing the outer appearance of an iron core for an electric rotary machine according to the present invention. An iron core 10 is formed into a ring-shaped configuration by shaping a strip (band-like thin plate) as an intermediate product of the iron core into a spirally laminated structure through a rolling-bending process. On the inner circumferential side of the iron core 10, a plurality of slots 12 and a plurality of teeth 13 for the insertion of winding wires as coil elements are alternately formed. For example, the total of thirty-six slots 12 are formed with a 10° pitch in a circumferential direction, while the total of thirty-six teeth 13 are formed with a 10° pitch in a circumferential direction.

In accordance with the present invention, the outer periphery of the iron core 10 is provided with notches 14 spreading in the axial direction of the core at regular intervals in the circumferential direction. Preferably, the notches 14 are arranged in correspondence with the positions of the circumferential direction of the teeth 13. For example, the total of thirty-six notches 14 are formed with a 10° pitch in the circumferential direction.

Figure 2:
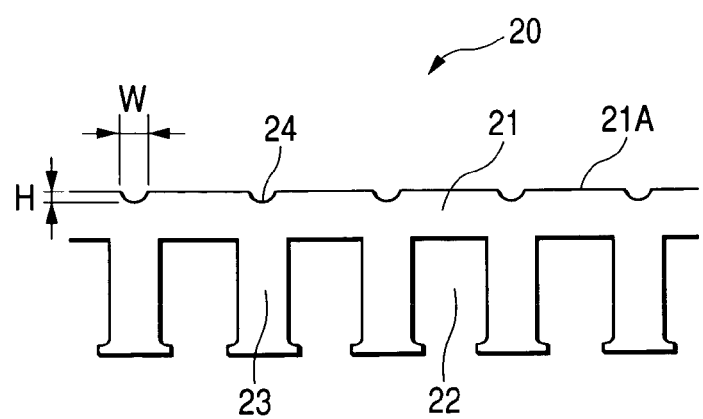
FIG. 2 is a partial plan view of a strip as a material of the iron core.

FIG. 2 is a partial plan view of the strip as the intermediate product of the iron core. As shown in the drawing, the strip 20 has a band-like yoke 21, slots 22 and teeth 23 formed alternately on one side of the yoke, and notches 24 formed on the other side of the yoke. The notches 24 are formed on the side opposite to the teeth 23 with the same regularity as the teeth 23. The width W and depth H of each of the notches 24 will be described later in detail with reference to FIG. 5. The strip is normally formed by blanking of press working. As will be described later, the strip is curved by a rolling process to the edge 21A of the yoke 21.

In accordance with the present invention, the iron core is formed by shaping the strip 20 shown in FIG. 2 into a spiral configuration through a rolling-bending process and laminating the bended strip in stacked relation. The notches 14 in the outer periphery of the iron core are constituted by the notches 24 formed in the strip 20. Although the iron core with a slot count of 36 is shown herein, the present invention is also applicable to an iron core with another slot count and to a slot-less iron core.

Figure 3:
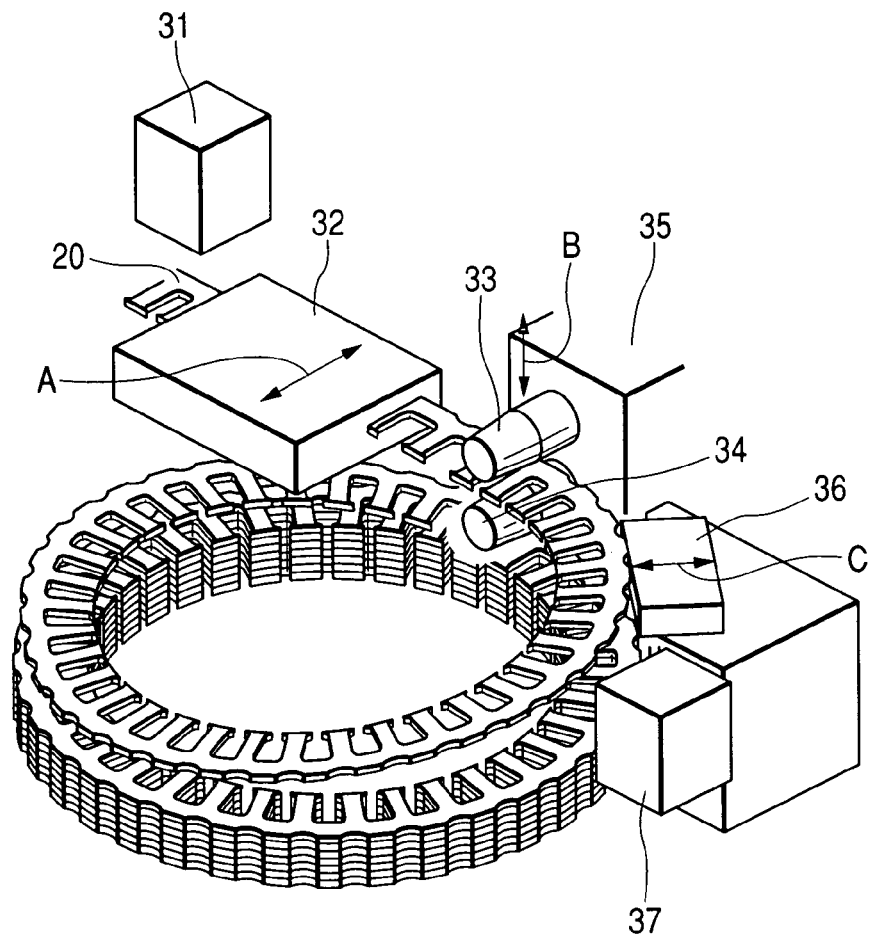
FIG. 3 is a perspective view showing the outer appearance of a rolling-bending apparatus according to the present invention.

FIG. 3 is a view showing the outer appearance of a rolling-bending apparatus according to the present invention. The rolling-bending apparatus according to the present example has a plate thickness measurement unit 31 for measuring the thickness of the strip, an inlet guide 32, a mill roll unit 35 comprising a pair of mill rolls 33 and 34, a restraint jig 36, and a curvature measurement unit 37. These are arranged in turn in the direction of movement of the strip 20.

The widthwise positioning of the strip 20 is performed by the inlet guide 32. Consequently, the strip 20 is smoothly fed into the space between the rolls 33 and 34 of the mill roll unit 35 without back-lash.

Figure 4:
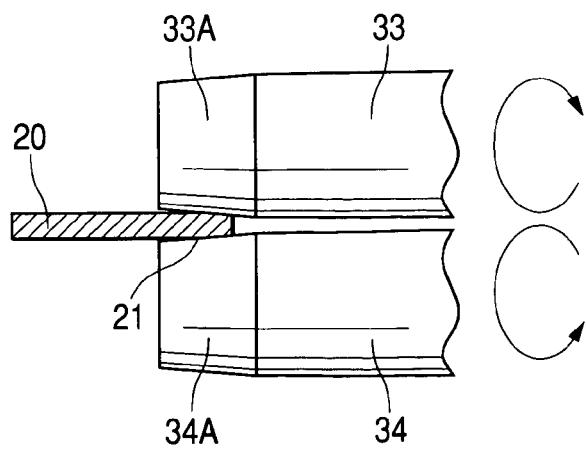
FIG. 4 is a view showing the state of the strip which is rolled by mill rolls.

As shown in FIG. 4, the mill rolls 33 and 34 have tapered portions 33A and 34A at the respective front part thereof. The edge 21A of the yoke 21 of the strip 20 is rolled by these tapered portions 33A and 34A. The edge 21A of the yoke 21 is plastically deformed so as to thin toward the tip thereof. Thereby the edge 21A of the yoke 21 spreads and the strip 20 curves.

By setting the taper angle θ of each of the tapered portions 33A and 34A to an appropriate value, a specified curvature is obtainable for the strip after the rolling process. Accordingly, the taper angle θ is set properly for each product item.

FIG. 3 will be referred to again. The strip 20 through the rolling-bending process is forcibly fed out by the rotation of the pressure rolls 33 and 34 to come in contact with the restraint jig 36. The restraint jig 36 has a plurality of rollers arranged in an arcuate configuration. The strip 20 is shaped under a bending force received from the rollers of the restraint jig 36. Consequently, the strip 20 is bent to have the specified curvature through plastic deformation by the tapered portions 33A, 34A of the mill rolls 33, 34 and the bending force from the restraint jig 36. The restraint jig 36 is provided with a guide (not shown in FIG.) for smoothly moving the strip. Since the restraint jig 36 is provided in the present example, the curvature of the strip after the rolling-bending process can be held uniform.

Figure 5:
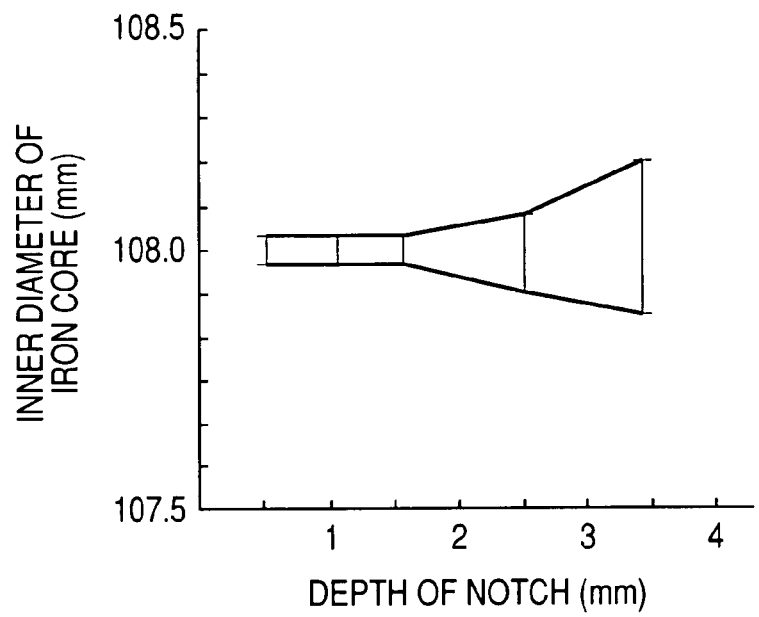
FIG. 5 is a view showing a dimensional relationship between the depth H of a notch and an inner diameter after rolling-bending.

Referring to FIG. 5, a description will be given to the result of an experiment which performed a rolling-bending process by using the rolling-bending apparatus according to the present invention. An iron core has a slot count of 36, an inner diameter of φ 108, an outer diameter of f 109, and a notch count of 36. The thickness of the strip as the intermediate product was set to 0.50 mm, the width W of the notch was set to 3.0 mm, the taper angle θ of the mill roll was set to 0.25°, and an amount of rolling was set to 30 μm. Under these conditions, a rolling width should geometrically be 3.44 mm. In an actual situation, however, the mill rolls have deflection and the rolling width was 3.2 mm. Five dimensions were prepared as the depth H of the notch. For the depth of each of the notches, 10 samples were prepared and variations in the inner diameter of the iron core were measured.

The ordinate of FIG. 5 represents the inner diameter (mm) of the iron core and the abscissa thereof represents the depth H (mm) of the notch. The vertical lines between the curves of FIG. 5 indicate the width of variations in the inner diameter of the iron core.

As shown in the drawing, the width of variations in the inner diameter of the iron core was about 50 μm when the depth H of the notch was in the range of 0.5 mm to 1.6 mm. When the depth H of the notch exceeds 1.6 mm, however, the width of variations in the inner diameter of the iron core increased. When the depth H of the notch exceeds 2.5 mm, a phenomenon of undulation appeared at the surface of the strip, so that the flatness deteriorates. When the flatness deteriorates in the case of the laminated iron core shown in FIG. 1, the accuracy of the thickness of the iron core deteriorates, which may result in a factor causing deterioration of the iron core's performance.

When the depth H of the notch exceeds 3.2 mm which is the rolling width, a portion unworked by the mill rolls was produced. As a result, the accuracy of the curvature was prominently deteriorated even when the restrained jig was used. Thus, it was proved that the depth of the notch should be smaller than the rolling width and, to further improve the accuracy of the curvature, the adjustment of the depth of the notch to a value not more than ½ of the rolling width was important.

The result of the experiment was based on the assumption that the thickness of the strip 20 was uniform. In an actual situation, the thickness of the strip normally has variations of about ±3 to 7%. When the strip 20 has a thickness of 0.5 mm, a size variation of ±0.015 to 0.035 mm exists. Accordingly, the plate thickness of the strip varies in the range of 0.465 to 0.535 mm. When the thickness of the strip 20 is, e.g., 0.5 mm, the positions of the mill rolls 33 and 34 are determined such that the amount of rolling becomes 30 μm.

When the plate thickness of the strip is minimum (0.465 mm), the amount of rolling becomes 0, and a rolling-bending cannot be performed. When the plate thickness is maximum (0.535 mm), the amount of rolling becomes 65 µm, which is excessively large, so that the curvature becomes small.

Even when the mechanical property (hardness, tensile strength, elongation property, or the like) of the strip changes, the amount of rolling changes so that the curvature of the strip after the rolling-bending process changes.

Figure 6:
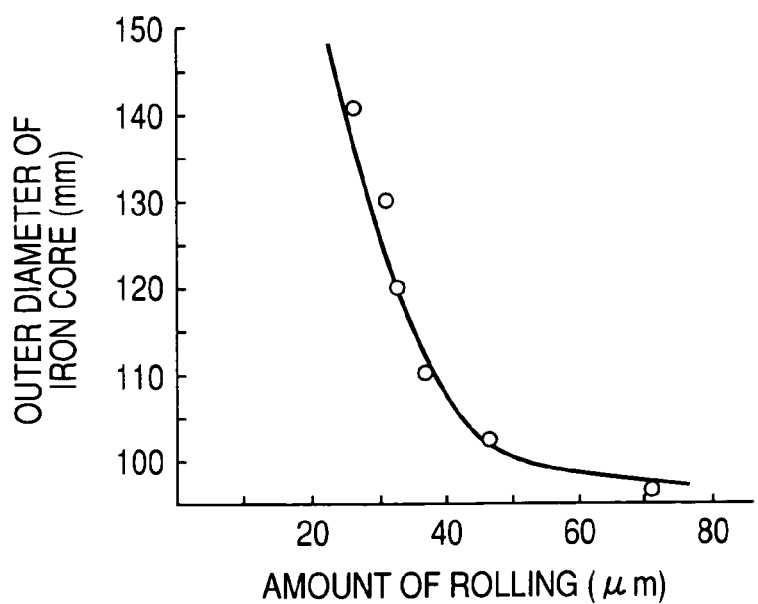
FIG. 6 is a view showing a relationship between an amount of rolling and a curvature.

FIG. 6 shows the result of another experiment which performed a rolling-bending process by using the rolling-bending apparatus according to the present invention. In the present example, a relationship between the amount of rolling and the curvature was examined. The ordinate represents the outer diameter mm of an iron core and the abscissa represents the amount of rolling µm. According to the present experiment, if the amount of rolling varies by 1 µm, the inner diameter of the iron core varies by 3 mm. From the fact, it will be understood that the retention of an equal amount of rolling is important for an improvement of the dimensional accuracy of the iron core.

To hold the amount of rolling equal, the following method has been proposed. Namely, a working stress caused by the mill rolls 33 and 34 is measured, and the position of the mill rolls 33 and 34 is controlled such that the working stress becomes uniform.

However, since the strip has the notches 24 in the present example, the contact area between the strip and each of the mill rolls 33, 34 intermittently changes. Accordingly, since the working stress caused by the mill rolls intermittently varies, it is difficult to precisely perform the position control. In general, it is extremely difficult to adjust an amount of rolling and stabilize a curvature.

FIG. 3 will be referred to again. In the rolling-bending apparatus of the present example, the amount of rolling is adjusted by the position control of the inlet guide 32 so that the post-process curvature of the strip 20 is adjusted thereby. By moving the inlet guide 32 in the direction indicated by the arrow A, i.e., in parallel with the axes of the mill rolls 33 and 34, the amount of rolling is adjusted. The amount of rolling is also adjusted by position control of the mill roll unit 35 so that the post-process curvature of the strip 20 is adjusted thereby. The amount of rolling is adjusted by changing the spacing between the two mill rolls 33 and 34. To change the spacing between the two mill rolls 33 and 34, one of the rolls 33 and 34, e.g., may be moved in the direction indicated by the arrow B. Further, the curvature is adjusted by the position control of the restraint jig 36. By moving the restraint jig 36 in the direction indicated by the arrow C, i.e., in the widthwise direction of the strip 20, the post-process curvature of the strip 20 is finely adjusted.

Figure 7:
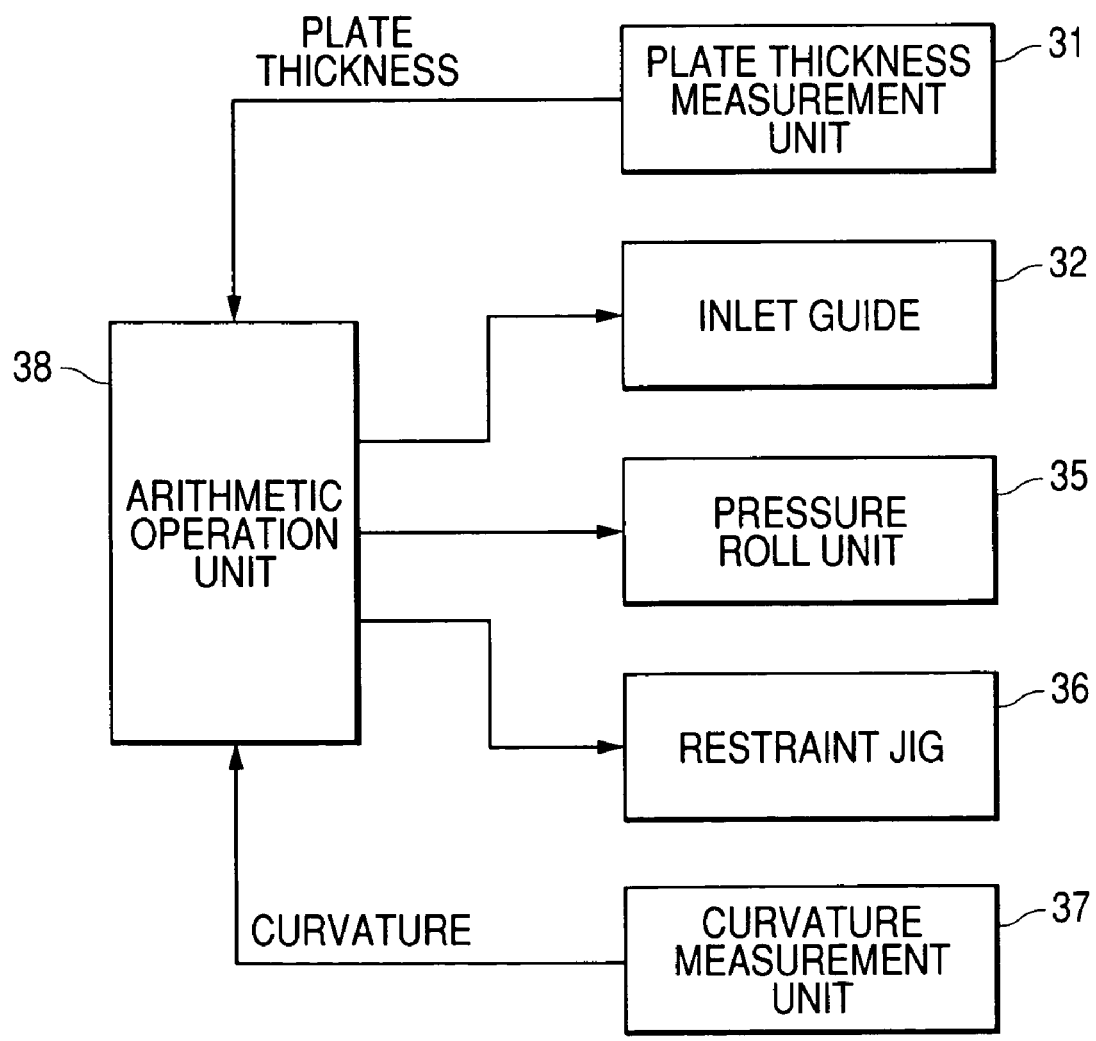
FIG. 7 is a view for illustrating position control in the rolling-bending apparatus according to the present invention.

A description will be given with reference to FIG. 7. The thickness of the strip 20 is measured by the plate thickness measurement unit 31. The curvature of the strip 20 after the rolling-bending process is measured by the curvature measurement unit 37. The measured plate thickness and curvature are supplied to the arithmetic operation unit 38. Based on the inputted plate thickness and curvature, the arithmetic operation unit 38 performs an arithmetic operation to obtain position control information to be supplied to the inlet guide 32, the mill roll unit 35, and the restraint jig 36. Experimental data may be used for the arithmetic operation for supplying the position control information. The positions of the inlet guide 32, the mill roll unit 35, and the restraint jig 36 are controlled based on the position control information supplied from the arithmetic operation unit 38.

According to the present example, three types of position control, which are the position control of the inlet guide 32, the position control of the mill roll unit 35, and the position control of the restraint jig 36, may be combined selectively and appropriately. However, the combination includes at least the position control of the inlet guide 32 or the position control of the restraint jig 36. For example, the amount of rolling may be adjusted only by the position control of the inlet guide 32 or by the combination of the position control of the inlet guide 32 and the position control of the mill roll unit 35. If two or three types of position control are combined, a proper ratio of amount of these position controls is determined. The arithmetic operation unit 38 performs an arithmetic operation to determine an optimum value of the ratio among respective amounts of position control assigned to the inlet guide 32, the mill roll unit 35, and the restraint jig 36.

A description will be given to an example of the position control of the inlet guide 32. A nip angle (double the taper angle θ) formed between the tapered portions 33A and 34A of the two mill rolls 33 and 34 is set to 0.5°. If moving the inlet guide 32 to the side of tips of the mill rolls 33 and 34 by 0.1 mm in parallel with these rolls, the strip 20 also moves to the side of tips of the mill rolls 33 and 34. This achieves a 0.8-µm reduction in the amount of rolling. Conversely, if moving the inlet guide 32 to the side of the basal portions of the mill rolls 33 and 34 in parallel with these rolls, the amount of rolling can be increased. It is sufficiently easy to perform position control of the inlet guide 32 on a per 0.1 mm basis. The position control of the inlet guide 32 allows fine adjustment of the amount of rolling.

Preferably, the position control of the mill roll unit 35 and the position control of the inlet guide 32 are combined. The majority of the adjustment of the amount of rolling is performed by the position control of the mill roll unit 35 and the fine adjustment of the amount of rolling is performed by the position control of the inlet guide 32. The arrangement allows high-precision adjustment of the amount of rolling.

For example, it is assumed that a strip having a thickness of 0.53 mm is inserted when the positions of the mill rolls 33 and 34 have been determined on the condition that the thickness of the strip 20 is 0.5 mm. In this situation, if assuming that the amount of rolling should be increased by 30 µm, the following control is performed. In this case, first, the amount of rolling is obtained by about 28 µm through the position control of the mill rolls 33 and 34. In addition, the inlet guide 32 is moved to the side of the tips of the mill rolls 33 and 34 by 0.25 mm, whereby the amount of rolling is increased by about 2 µm.

Even if the amount of rolling is controlled precisely based on a variation in the thickness of the strip, the post-process curvature of the strip is varied by various factors including a variation in the mechanical property of the material thereof. In the present example, the curvature measured by the curvature measurement unit 37 is further feedbacked. The arithmetic operation unit 38 determines a deviation between a measured value of the curvature and a design (target) value. Based on the deviation, the position control of the mill roll unit 35 and the position control of the inlet guide 32, which have been described above, are amended. For example, if the deviation is positive, i.e., if the curvature is larger than the design value, the position control of the pressure roll unit 35 and the position control of the inlet guide 32 are corrected such that the amount of rolling becomes smaller. Conversely, if the deviation is negative, i.e., if the curvature is smaller than the design value, the position control of the pressure roll unit 35 and the position control of the inlet guide 32 are corrected such that the amount of rolling becomes larger. In this case also, only the position control of the inlet guide 32 may be corrected if a correction value for the amount of rolling is small. If the correction value for the amount of rolling is large, the correction of the position control of the pressure roll unit 35 and the correction of the position control of the inlet guide 32 are combined. Thus, according to the present example, an extremely high-precision iron core can be manufactured by feedbacking an output of the curvature measurement unit 37 to the mill roll unit 35 and to the inlet guide 32.

In accordance with the present invention, the post-process curvature of the strip is further finely adjusted by using the restraint jig 36. The position control of the restraint jig 36 allows fine adjustment of the post-process curvature of the strip without changing the amount of rolling.

Figure 8:
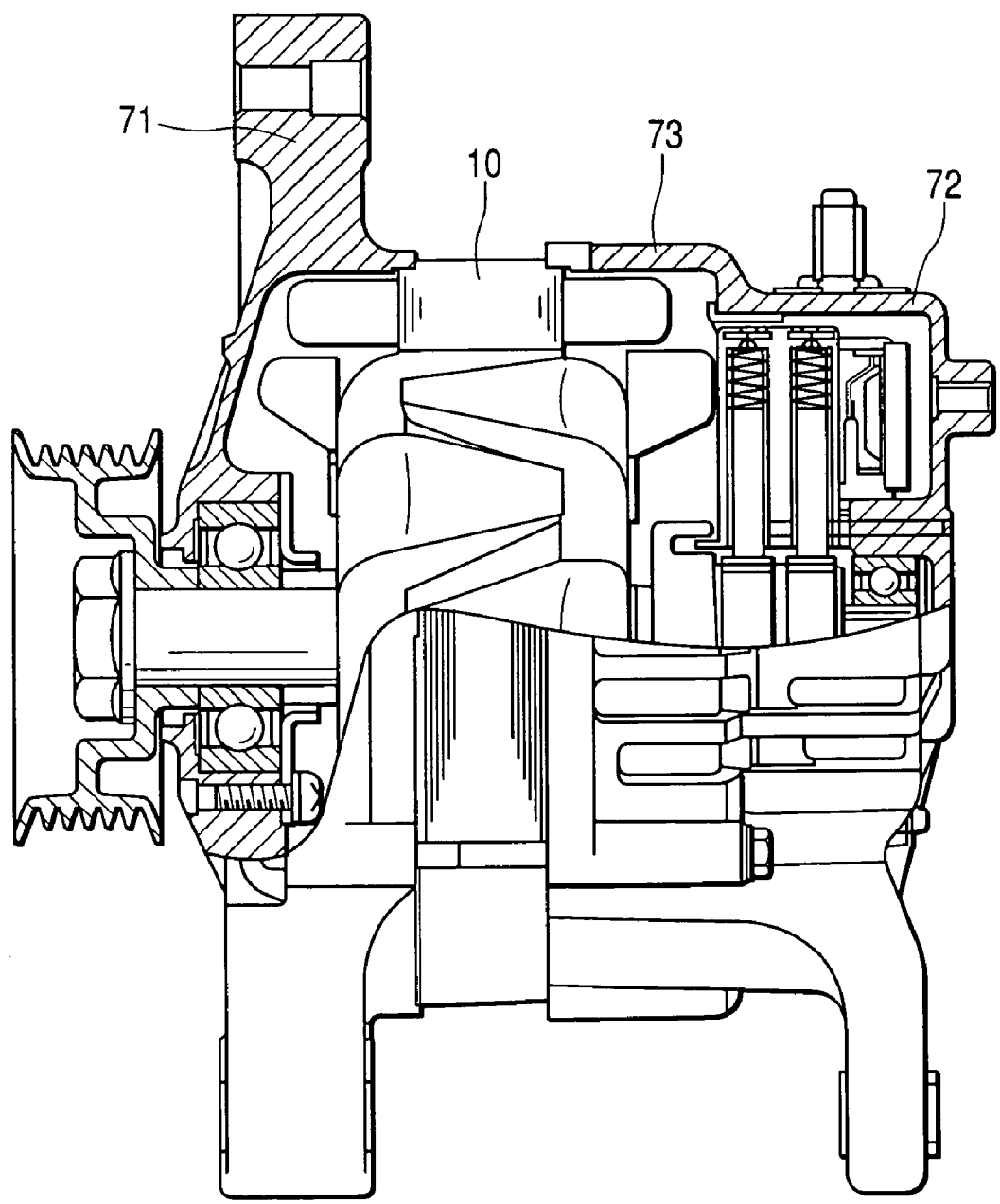
FIG. 8 is a cross-sectional view of an ac power generator for an automobile using an iron core according to the present invention.

FIG. 8 shows an example in which an iron core manufactured by the apparatus and method of the present invention is used in an ac power generator for an automobile. The iron core 10 is mounted and fixed between a front bracket 71 and a rear bracket 72. The iron core 10 of the present invention was excellent in dimensional accuracy, so that an ac power generator 73 for an automobile having high power generation efficiency was obtained. It is to be noted that the present invention can use a steel plate or silicon steel plate having an extremely small thickness (less than 0.5 mm) that has conventionally been considered difficult to be used as a material for a spirally laminated iron core. An iron core composed of such an extremely thin plate achieves a higher-than-ever efficiency in the ac power generator 73 for an automobile.

In accordance with the present invention, when an iron core for electric rotary machine is manufactured by forming the strip into a spirally laminated structure through a pressing-bending process, the iron core can be manufactured with high accuracy even if the strip thin plate has thickness variations.

What is claimed is:

1. A ring-shaped iron core for an electric rotary machine comprising an outer periphery provided with notches spreading in an axial direction of said core at regular intervals in a circumferential direction,
    wherein said iron core is shaped into a ring by rolling and spirally laminating a strip including said notches and having a thickness of less than 0.5 mm, and
    wherein each of said notches has a depth that is no less than 0.5 mm and no greater than ½ of a width of each notch after rolling of said strip.

2. The iron core according to claim 1, wherein said notches are arranged at positions opposite to teeth provided in an inner circumference of said iron core.

3. The iron core according to claim 1, wherein said notches are arranged at positions opposite to teeth provided in an inner circumference of the iron core, and wherein the number of the notches provided is the same as that of the teeth.

4. The iron core according to claim 1, wherein said strip is composed of a silicon steel plate.

5. A ring-shaped iron core for an electric rotary machine comprising an outer periphery provided with notches spreading in an axial direction of said core at regular intervals in the circumferential direction,
    wherein said iron core is shaped like a ring by rolling and spirally laminating a strip with a thickness of 0.465 mm-0.535 mm, and
    wherein each of said notches has a depth that is no less than 0.5 mm and no greater than ½ of a width of each notch after rolling of said strip.

6. The iron core according to claim 5, wherein said notches are arranged at positions opposite to teeth provided in an inner circumference of said iron core.

7. The iron core according to claim 5, wherein said notches are arranged at positions opposite to teeth provided in an inner circumference of the iron core, and wherein the number of the notches provided is the same as that of the teeth.

8. The iron core according to claim 5, wherein said strip is composed of a silicon steel plate.

9. A vehicle-mounted electric rotary machine that is used as a generator for a vehicle, comprising:
    an iron core fixed between a front bracket and a rear bracket of said electric rotary machine and having a spirally-laminated yoke, teeth formed on one side circumference of said yoke, slots formed alternatively with said teeth on the one side circumference of said yoke, and notches formed on the other side circumference of said yoke so as to spread in the axial direction of said iron core at regular intervals in the circumferential direction, and
    windings inserted into said slots formed on said yoke,
    wherein said iron core is shaped like a ring by rolling and spirally laminating a strip with a thickness of less than 0.5 mm to define said yoke, said teeth, said slots, and said notches, and
    wherein each of said notches has a depth no less than 0.5 mm and less than ½ of a width of each notch after rolling said strip.

10. A vehicle-mounted electric rotary machine that is used as a generator for a vehicle, comprising:
    an iron core fixed between a front bracket and a rear bracket of said electric rotary machine and having a spirally-laminated yoke, teeth formed on one side circumference of said yoke, slots formed alternatively with said teeth on the one side circumference of said yoke, and notches formed on the other side circumference of said yoke so as to spread in the axial direction of said iron core at regular intervals in the circumferential direction, and
    windings inserted into said slots formed on said yoke,
    wherein said iron core is shaped like a ring by rolling and spirally laminating a strip with a thickness of 0.465 mm-0.535 mm to define said yoke, said teeth, said slots, and said notches, and
    wherein each of said notches has a depth no less than 0.5 mm and less than ½ of a width of each notch after rolling said strip.

* * * * *